(12) United States Patent
Siegenthaler

(10) Patent No.: US 10,563,420 B2
(45) Date of Patent: Feb. 18, 2020

(54) STAND BASE WITH ROLLERS

(71) Applicant: Glatz AG, Freuenfeld (CH)

(72) Inventor: Robert Ulrich Siegenthaler, Bulach (CH)

(73) Assignee: Glatz AG (CH)

( * ) Notice: Subject to any disclaimer, the term of this patent is extended or adjusted under 35 U.S.C. 154(b) by 0 days.

(21) Appl. No.: 16/108,582

(22) Filed: Aug. 22, 2018

(65) Prior Publication Data

US 2019/0063103 A1 Feb. 28, 2019

(30) Foreign Application Priority Data

Aug. 23, 2017 (DE) .................... 20 2017 105 072 U

(51) Int. Cl.
| | | |
|---|---|---|
| *A47K 1/04* | (2006.01) | |
| *E04H 12/22* | (2006.01) | |
| *F16M 11/42* | (2006.01) | |

(52) U.S. Cl.
CPC ......... *E04H 12/2238* (2013.01); *F16M 11/42* (2013.01); *F16M 2200/08* (2013.01)

(58) Field of Classification Search
CPC ........... A61G 5/00; B62B 5/0083; B25H 5/00
See application file for complete search history.

(56) References Cited

U.S. PATENT DOCUMENTS

| | | | | |
|---|---|---|---|---|
| 2,537,909 | A * | 1/1951 | Puddester | A61G 5/00 188/2 F |
| 4,815,569 | A * | 3/1989 | Norman | B25H 5/00 188/5 |
| 5,348,326 | A * | 9/1994 | Fullenkamp | A61G 7/00 280/43 |
| 2012/0285497 | A1 | 11/2012 | Li | |
| 2016/0258573 | A1 | 9/2016 | Goldish et al. | |

FOREIGN PATENT DOCUMENTS

| | | |
|---|---|---|
| CN | 105249638 A | 1/2016 |
| DE | 102014103745 A1 | 10/2015 |
| DE | 102014006890 A1 | 11/2015 |
| EP | 1571277 A1 | 9/2005 |
| EP | 1621171 A1 | 2/2006 |

OTHER PUBLICATIONS

German Patent Office Search Report and English translation.

* cited by examiner

*Primary Examiner* — Amy J. Sterling
(74) *Attorney, Agent, or Firm* — George Pappas

(57) ABSTRACT

A movable standing base for parasols, display boards, flagpoles and the like comprises a weight part having, firmly attached at the bottom side thereof, at least three, preferably four steering rollers, and it further comprises attachment elements for a parasol, for a display board, for a flagpole or for any other objects to be set up, and a plurality of preferably four lowerable blocking feet. In order to improve ease of handling without loss of stability, the blocking feet are connected to each other in the edge region of the weight part by two bridge girders arranged opposite to each other and a middle yoke and are anchored to the weight part in a substantially parallelogram shaped lowerable manner by two pivot levers. A tensioning lever is disposed resting on the middle yoke, and a pressure element leads to a blocking pedal at the upper side of the standing base.

21 Claims, 6 Drawing Sheets

STAND BASE WITH ROLLERS

FIELD OF THE INVENTION

The invention relates to a movable standing base for parasols, display boards, flagpoles or similar applications, the standing base comprising a weight part, rollers at the bottom side of the standing base and lowerable support feet to establish a standingly stable situation.

BACKGROUND OF THE INVENTION

There certainly exist some solutions as to how a movable standing base can be brought from a standingly stable situation on ground into a movable (rollable) situation and back again. In a plurality of solutions, it is proposed to raise the weight part so as to reach the movable (rollable) situation and to lower the weight part for reaching the standingly stable situation. This often requires long, upwardly or laterally projecting levers and force transmission devices. For an example, see EP 1 571 277 A1 (FIGS. 3a and 3b). This is disadvantageous because of the effort required, but also due to the presence of projecting parts such as levers.

Just these disadvantages, namely the necessity to raise the weight part of the standing base and thereby also to provide complicated operating elements extending to the outside of the standing base for just this lifting action, are also evident from DE 10 2014 006890 A1.

Other proposed generic bases include pumping or ratcheting devices such as described i.e. in CN 105 249 638 A1 (FIG. 3 and FIG. 5), which requires a considerable amount of operating time. Moreover, in the case of the base disclosed in CN 105 249 638 A1, it is not a priori obvious whether the base is in the stable or in the rollable state, which is unsatisfactory for safety reasons.

In US 2012/0285 497 A1 it is suggested to let the rollers be lowered and raised individually (FIG. 2, 3A, 3B), moreover, the lowering and raising of stand feet is described (FIGS. 9, 10A and 10B). The operation of each roller individually or each stand foot individually is inconvenient, confusing and requires a substantial operating effort and entails security risks. Merging the various components of the stand foot with their respective lowering and reversing mechanisms onto a single central pumping pedal causes an undesirable manufacturing cost.

SUMMARY OF THE INVENTION

The object of the invention is thus to propose a movable standing base of he above mentioned type, which is able to overcome the identified weaknesses of the prior art and thus to offer a solution in which a standingly stable situation can be achieved without the necessity of raising the weight part that makes the base standingly stable, and in which the standingly stable position can be easily and safely established and released. Thereby, it is furthermore an object of the invention to develop a movable standing base with various configurational options regarding weight and design, and with an accessible and walkable upper side, wherein the standing base can be formed both as a monoblock and by means of a support frame for a plurality of individual weights, without departing from the principle of the invention. Moreover, it is important for the invention to provide an easy operation by means of an operating element for a foot operation which is restricted to the upper face of the base, that is, without any laterally projecting parts. Still further, it should easily be recognizable whether the base is in its movable or standingly stable (blocked) state. Finally, the base should allow for an easy and inexpensive construction, should be non-slipping on a smooth floor and should have a high resistance against tilting.

The object of the invention is achieved by a movable standing base. Thereby, the measures of the invention result in a substantial simplification of the operation by means of simple pedal pressing. Thereby, the construction is very compact and provides an accessible upper side without laterally projecting and injury-prone parts, and without any projecting long lifting rods; moreover, no laborious pumping or cranking effort is required.

Regarding the steering rollers as well as regarding the blocking feet, a plurality of three elements each is sufficient in principle, thereby defining a respective plane, as is generally known. Preferably, however, a plurality of four or even more steering rollers and blocking feet, respectively, is used, which have to be disposed each in a common plane in order to perform the intended task.

Due to a simple construction and simple design of force relationships, it is is advantageous to have the two bridge girders arranged opposite to each other being connected to the middle yoke in an H-shaped manner. The force that must be applied in order to provide the necessary pressure on to the blocking feet without having the weight part with rollers being raised from the ground below the stand surface is substantially determined by the distance A between the pivot point of the tensioning lever disposed at the weight part and the pressure region of the pressure element. It is advantageous if the distance A is greater than the distance B. An advantageous embodiment is provided if at least one tensile spring is disposed between the middle yoke and the weight part, which exerts an upwards pull. Advantageously, there is provided a housing, which holds a blocking disk in upwards and downwards pivotable manner while the blocking disk surrounds the pressure element with a hole and blocks the latter in the depressed position by canting, a downwards pressing of the free end of the blocking disk with hole causing the blocking disk to rest on stop surfaces, whereby the blocking of the pressure element is effected in releasable manner. Thereby, at least one supporting spring pushes the free end of the blocking disk upwards. Advantageously, the supporting springs are configured in the form of flexible tongues as integrated parts of the housing. Thereby, a pressure spring is formed in such manner that it pushes the blocking pedal upwards. The weight part may be formed as a monolithic block, but it may also be formed as a component group with a load frame and additional loads.

Advantageously, the bridge girders, middle yoke and tensioning lever are arranged in such manner that they exert, in the blocking position, a persistent pressure on the blocking feet caused by residual tensile stress. For the attachment of the parasol rod, flagpoles, display boards etc. there are various possibilities. It is possible that the attachment elements connected to the weight part comprise a tube for receiving a rod. Alternatively, however, a flange plate may be provided to which—possibly also by means of a tube or directly—the parasol rod, flagpoles, display boards etc. are flanged on. In principle, various configuration can be considered for the pressure element such as, for example, bolt-shaped or cam-like elements. Advantageously, the pressure element is configured in a bolt-shaped manner, that is, as pressure bolt.

The aforementioned elements as well as those claimed and described in the following exemplary embodiments, to be used according to the invention, are not subject to any particular conditions by way of exclusion in terms of their size, shape, use of material and technical design, with the result that the selection criteria known in the respective field of application can be used without restrictions.

BRIEF DESCRIPTION OF THE DRAWINGS

Further details, advantages and features of the object of the present invention will become apparent from the following description and the corresponding drawings, in which a standing base according to the present invention is illustrated by way of example. In the drawings, there is shown in.

DETAILED DESCRIPTION OF THE PREFERRED EMBODIMENTS

Figure 1:
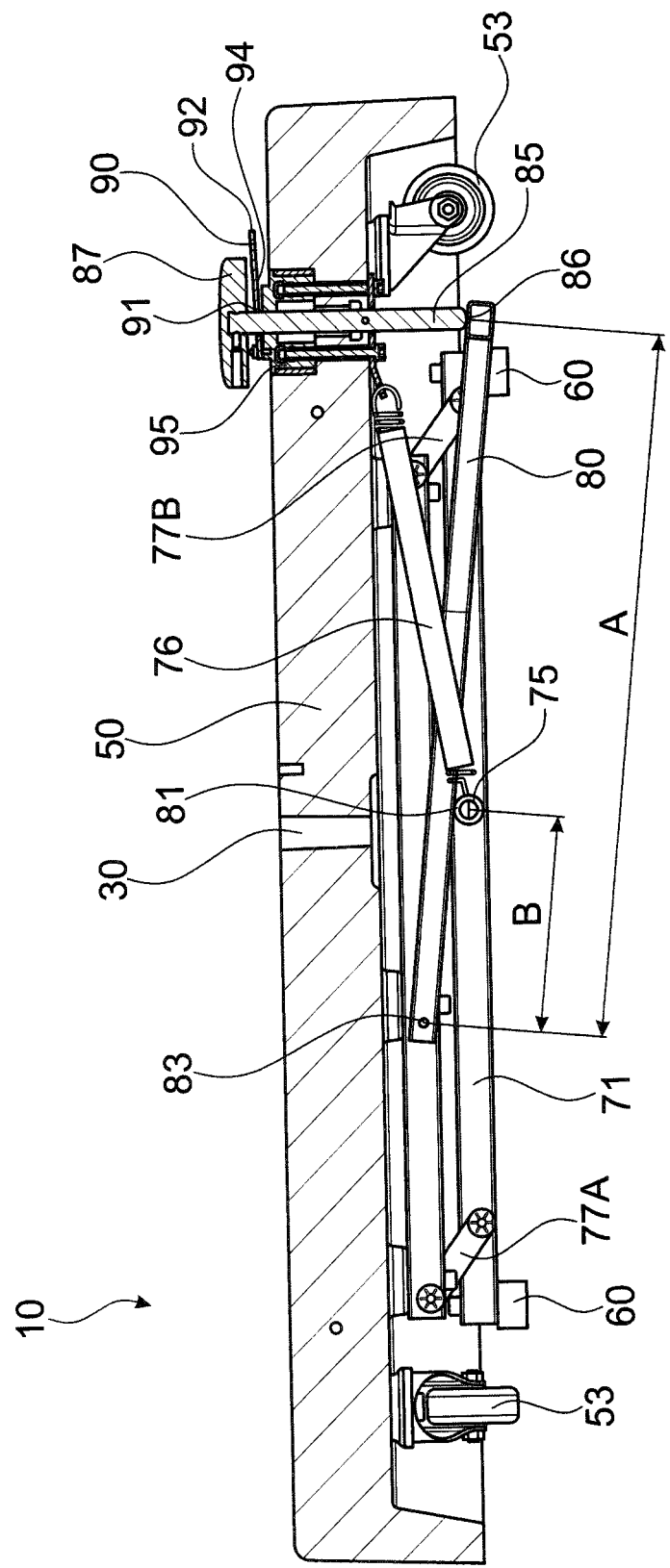
FIG. 1 a base according to a first exemplary embodiment, in a side view (in section), FIG. 2 the blocking mechanism for the base according to FIG. 1, FIG. 3 a perspective drawing of the base according to FIG. 1, in an oblique view from below, in the state in which the blocking feet are raised, FIG. 4 a perspective drawing of the base according to FIG. 1, in an oblique view from below, in the state in which the blocking feet are lowered, FIG. 5 a weight unit as a frame with additional weights as an alternative to the solution comprising a single weight part as in FIG. 1, and FIG. 6 a representation of the device with pedal spring.
Figure 2:
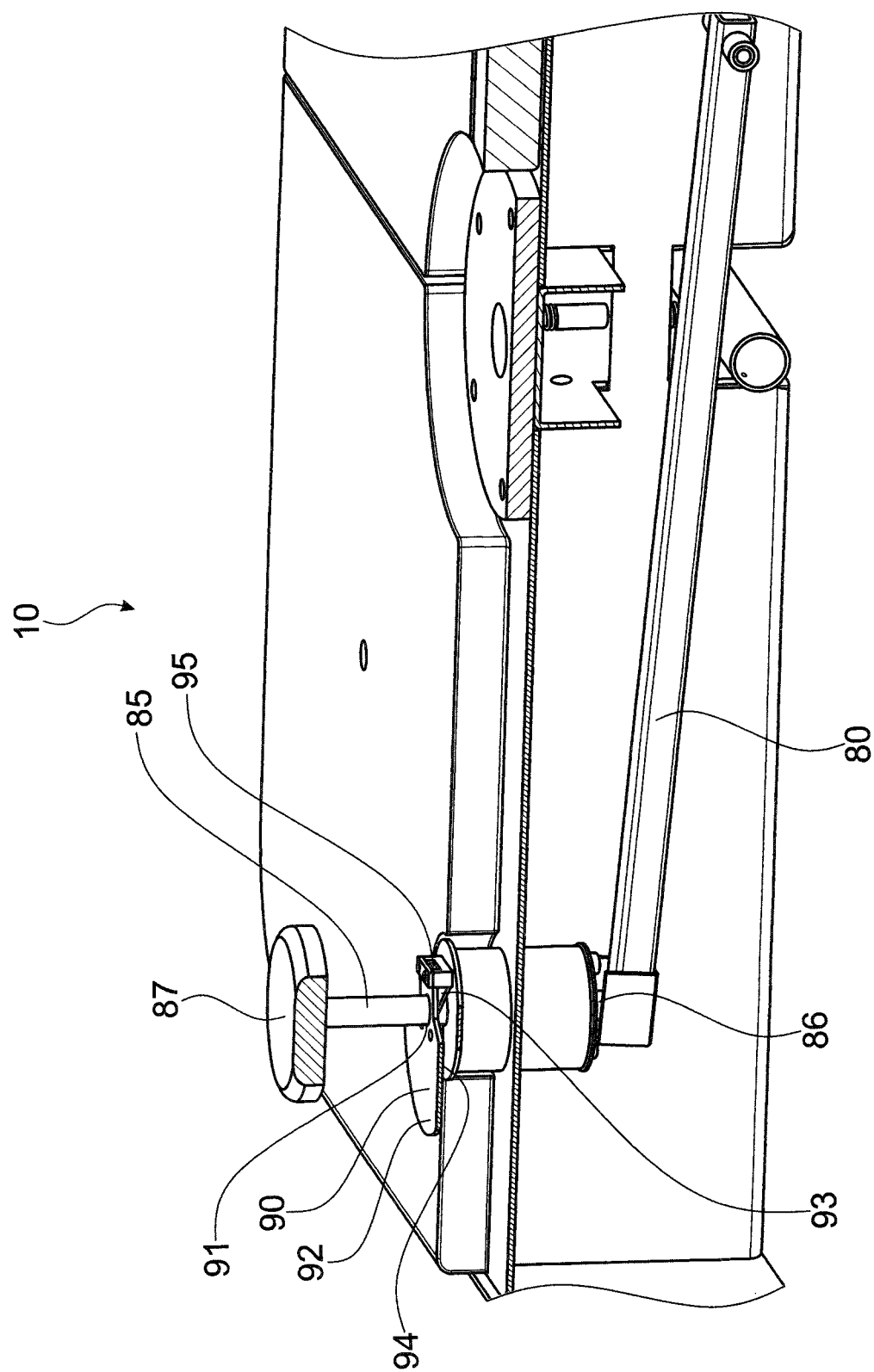
Figure 3:
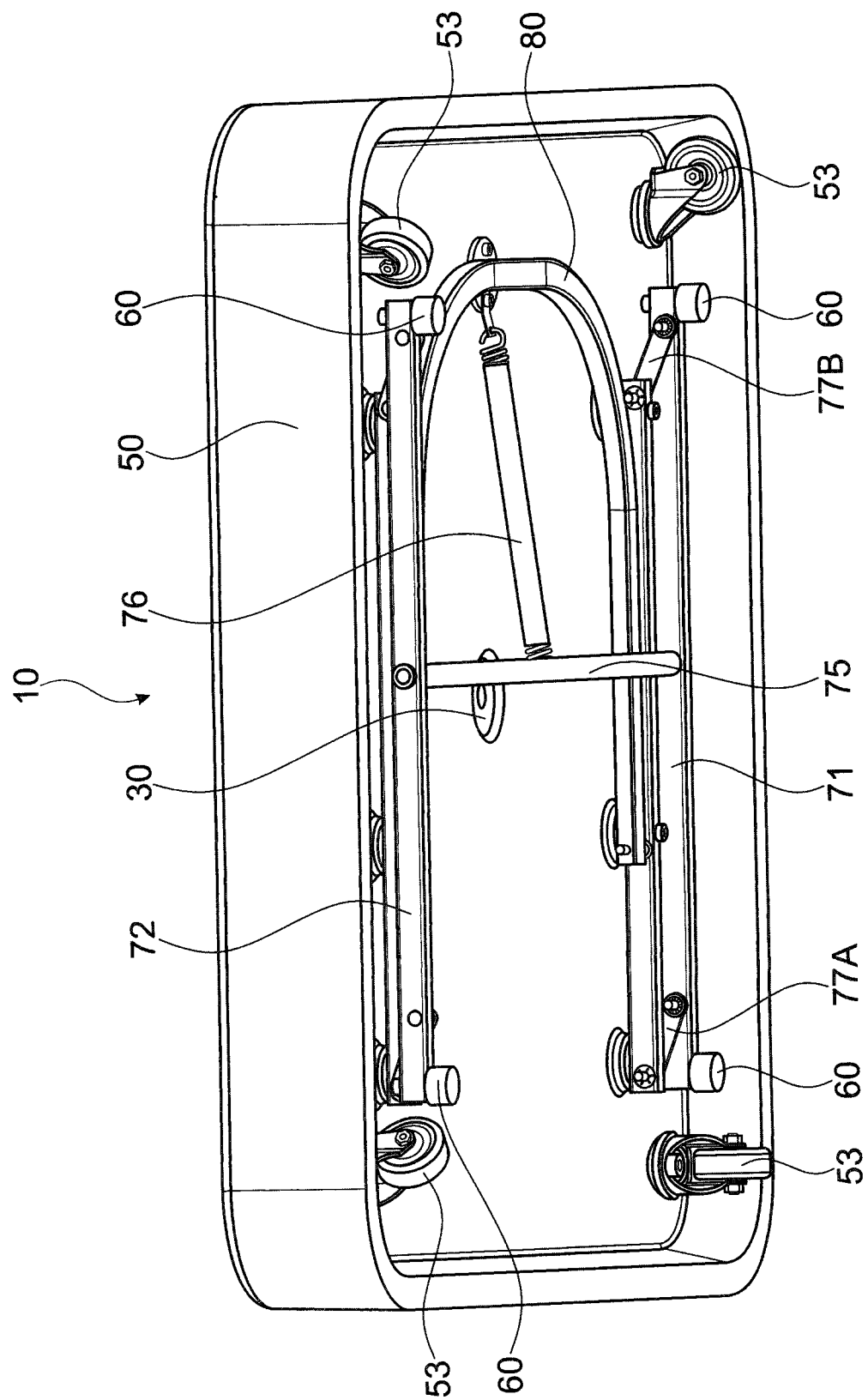
Figure 4:
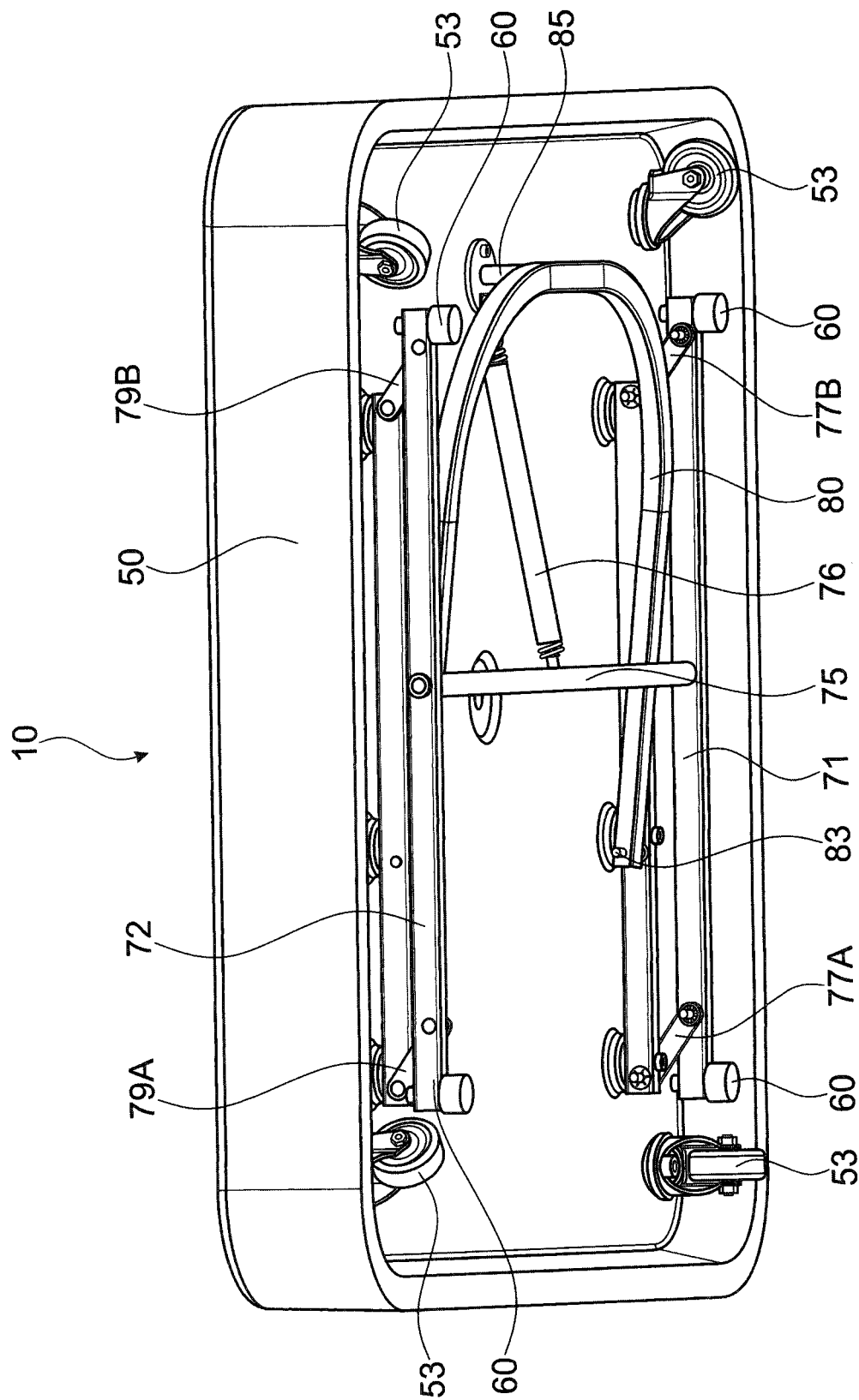

The movable standing base 10 with the stand tube 30 embedded in the base center as attachment elements for a parasol, a flag etc. shown in FIG. 1 comprises, in the present exemplary embodiment, a weight part 50, in the edge region of which four steering rollers 53 are firmly attached. At two bridge girders 71, 72, which in the exemplary embodiment are parallel and opposite to each other, and which are connected by means of a middle yoke 75 to form an H-shaped structure, four blocking feet 60 are arranged at respective edge regions of the bridge girders 71, 72. The bridge girders 71, 72 are each connected to the weight part 50 via parallel pivot levers 77A, 77B, 79A and 79.

A tensioning lever 80, which in the exemplary embodiment is two-armed, is attached to the weight part 50, which tensioning lever is pivotable upwards and downwards at one end thereof. The tensioning lever rests on the middle yoke 75 and forms, with its other end, the connection to a pressure bolt 85, which leads to the blocking pedal 87 at the upper side of the weight part 50. The length portion of the tensioning lever 80 that exceeds the distance between pivot point 83 and contact point 81 at the middle yoke 75 allows determining the transferred force intended to act from the blocking pedal 87 onto the blocking feet 60. The tensile spring 76 between middle yoke 75 and the weight part 50 raises the blocking feet 60 from the ground when the pressure bolt 85 is released.

Maintenance of the pressure tension between the blocking feet and the pressure bolt is effected by canting the blocking disk 90, which surrounds the pressure bolt 85 with a hole 91. For this purpose, the blocking disk 90 is held at one side thereof in a plastic housing 95 in an up- and down-swingable manner and is urged upwards by flexible tongues of the supporting spring 93, which tongues are formed as integral components of the plastic housing. To release the blockage, a foot pressure action on the free end 92 of the blocking disk 90 is sufficient, whereby the latter is brought into the "released" position by the stop surfaces 94 of the plastic housing. In the exemplary embodiment, a pedal spring 96 is used, in addition to the spring 76, at the middle yoke 75.

Figure 5:
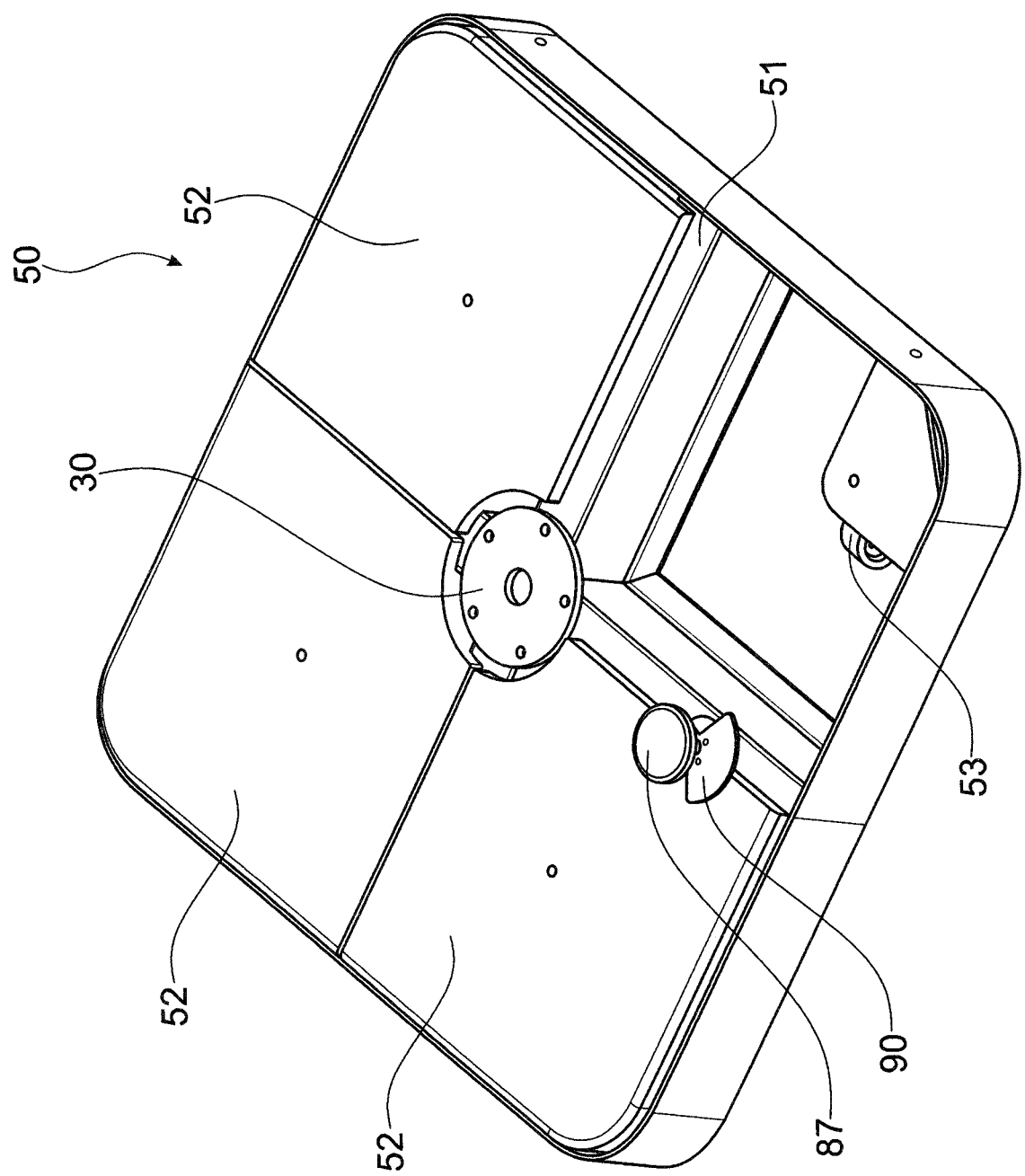

In case a large weight is required, it is advantageous to assemble several weight bodies forming additional loads 52 in a load frame 51, in accordance with an alternative exemplary embodiment as shown in FIG. 5.

Figure 6:
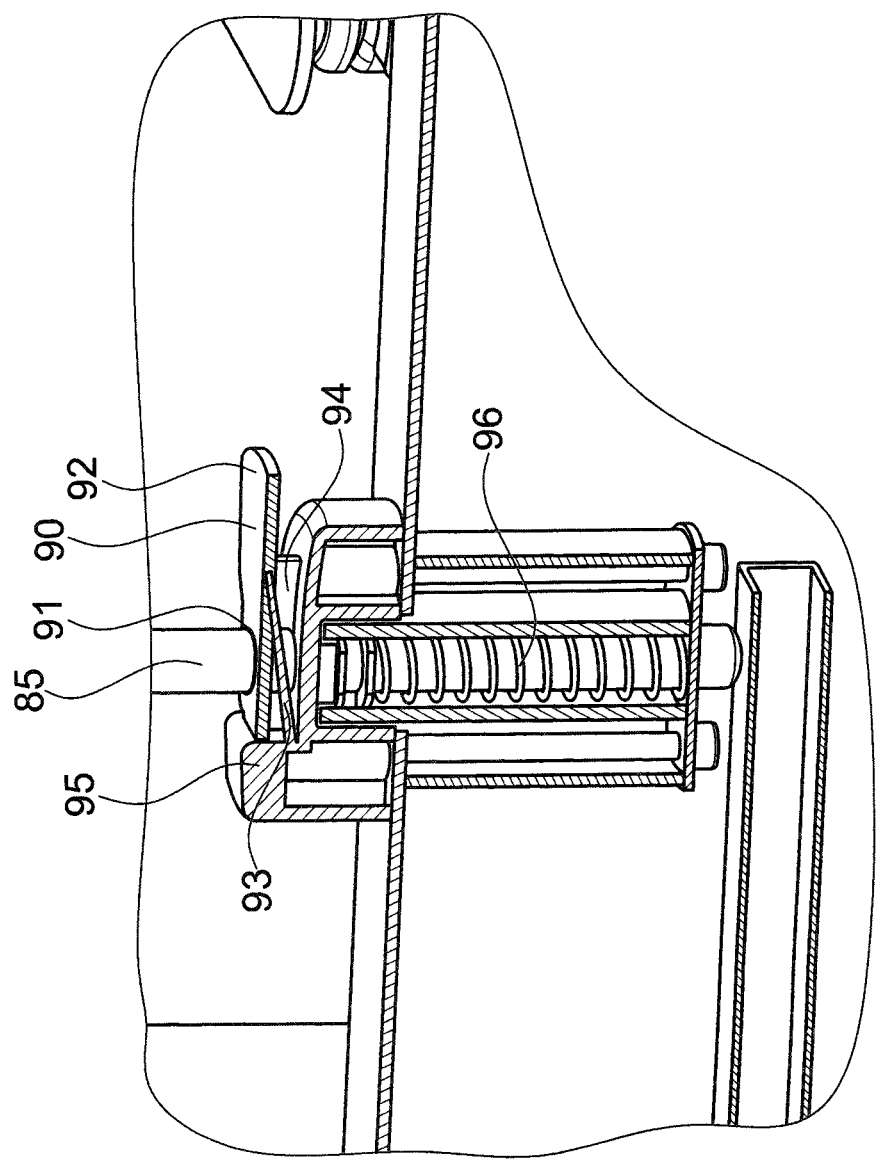

It should be noted that the blocking mechanism shown in FIG. 6 substantially corresponds to conventional door stoppers and the like, which generally have a single blocking foot at their lower end.

A prominent feature of the embodiments of the present invention shown in the figures is the flat construction of the mechanism for switching from the movable to the blocked state. The steering rollers 53 form a broad support and are firmly fixed to the weight part. For the purpose of fixation against rolling off or tilting, there are blocking feet 60 with anti-slip surfaces in immediate vicinity of the edge or corner points of the bottom surface of the base.

LIST OF REFERENCE NUMERALS

10 standing base
30 extension elements
50 weight part
51 load frame
52 additional loads
53 steering rollers
60 blocking feet
71 bridge girder
72 bridge girder
75 middle yoke
76 tensile spring
77A and B pivot lever
79A and B pivot lever
80 tensioning lever
81 contact point
83 pivot point
85 pressure element
86 pressure region
87 blocking pedal
90 blocking disk
91 hole for canting
92 free end of the disk
93 supporting springs
94 stop surfaces
95 plastic housing
96 pedal spring

The invention claimed is:

1. A movable standing base for parasols, display boards and flagpoles, the movable standing base comprising a weight part having, firmly attached at the bottom side thereof, at least three steering rollers, and further comprising attachment elements for a parasol, for a display board, for a flagpole or for any other objects to be set up, and further comprising a plurality of four lowerable blocking feet, characterized in that the blocking feet are connected to each other in the edge region of the weight part by of two bridge girders arranged opposite to each other and by a middle yoke and are anchored to the weight part in a substantially parallelogram shaped lowerable manner by two pivot levers, that a tensioning lever is disposed resting on the middle yoke, and that a pressure element leads to a blocking pedal at the upper side of the standing base.

2. The movable standing base according to claim 1, characterized in that the two bridge girders arranged opposite to each other and the middle yoke are connected to each other in a substantially H-shaped manner.

3. The movable standing base according to claim 1, characterized in that the distance between the pivot point of the tensioning lever of the weight part and the pressure region of the pressure element is larger than the distance between the rotating point and the contact point on the middle yoke.

4. The movable standing base according to claim 1, characterized in that there is provided at least one tensile spring to exert an upward pull between middle yoke and weight part.

5. The movable standing base according to claim 4, characterized in that there is provided a housing which holds a blocking disk in upward and downward pivotable manner while the blocking disk is provided with a hole surrounding the pressure element and blocks the latter in the depressed position by canting, a depressing of free end of the blocking disk with hole causing the blocking disk to rest on stop surfaces, whereby the blocking of the pressure element is effected in releasable manner.

6. The movable standing base according to claim 5, characterized in that there is at least one supporting spring which pushes the free end of the disk upwards.

7. The movable standing base according to claim 6, characterized in that the supporting springs are configured in the form of flexible tongues as integrated parts of the housing.

8. The movable standing base according to claim 7, characterized in comprising a pressure spring which pushes the blocking pedal upwards.

9. The movable standing base according to claim 1, characterized in that the weight part comprises a component group with a load frame and additional loads.

10. The movable standing base according to claim 1, characterized in that the bridge girder, middle yoke and tensioning lever are arranged in such manner that they exert, in the blocking position, a persistent pressure on the blocking feet caused by residual tensile stress.

11. The movable standing base according to claim 1, characterized in that the pressure element is configured as pressure bolt.

12. The movable standing base according to claim 2, characterized in that the distance between the pivot point of the tensioning lever of the weight part and the pressure region of the pressure element is larger than the distance between the rotating point and the contact point on the middle yoke.

13. The movable standing base according to claim 2, characterized in that there is provided at least one tensile spring to exert an upward pull between middle yoke and weight part.

14. The movable standing base according to claim 3, characterized in that there is provided at least one tensile spring to exert an upward pull between middle yoke and weight part.

15. The movable standing base according to claim 2, characterized in that the weight part comprises a component group with a load frame and additional loads.

16. The movable standing base according to claim 3, characterized in that the weight part comprises a component group with a load frame and additional loads.

17. The movable standing base according to claim 4, characterized in that the weight part comprises a component group with a load frame and additional loads.

18. The movable standing base according to claim 5, characterized in that the weight part comprises a component group with a load frame and additional loads.

19. The movable standing base according to claim 6, characterized in that the weight part comprises a component group with a load frame and additional loads.

20. The movable standing base according to claim 7, characterized in that the weight part comprises a component group with a load frame and additional loads.

21. The movable standing base according to claim 8, characterized in that the weight part comprises a component group with a load frame and additional loads.

* * * * *